Patented Feb. 26, 1952

2,587,501

UNITED STATES PATENT OFFICE 2,587,501

DRILLING FLUID COMPOSITIONS

Victor G. Meadors, Tulsa, Okla., assignor to Standard Oil Development Company, a corporation of Delaware No Drawing. Application December 30, 1949, Serial No. 136,176

7 Claims. (Cl. 252—8.5)

The present invention concerns the treatment of drilling fluids employed in the drilling of oil and gas wells. More particularly it relates to the use of non-ionic addition agents adapted to increase the viscosity of drilling fluids.

In conventional procedures for drilling oil and gas wells, particularly when the rotary method is employed, it is common practice to circulate around the drill in the bore hole a fluid known as a drilling mud which serves a number of functions, including carrying the bit cuttings out of the bore hole, lubricating the drill pipe and drilling tool, and providing a hydrostatic head in the well to prevent the uncontrolled escape of gases or liquids from various formations encountered during drilling. The drilling mud also serves to form a lining on the wall of the bore hole which helps to prevent the walls of the bore hole from caving and to plug up permeable formations and thereby prevent the flow of fluid from the well bore outwardly into the permeable formations. The normal procedure during drilling is to circulate the mud down through the interior of the drill pipe and then back up to the surface through the annulus between the drill pipe and the wall of the bore hole. The drilling fluid issuing from the well is usually passed over a screen and then through a ditch or trough to a mud pit, to be recirculated through the drill pipe by suitable pumps.

The most common type of drilling mud is essentially a dispersion of a finely divided colloidal material, such as clay, bentonite or the like, in water, together with other materials so that the mud will have the special properties required to perform the several functions enumerated above. The properties of the mud that are of principal concern are viscosity, gel strength, and density. The proper density is necessary to furnish sufficient hydrostatic head in the borehole so that the pressure exerted will exceed that of the various fluids encountered in the formations traversed by the borehole. Weighting materials such as silica, iron oxide or barytes, more commonly the latter, are usually added to the drilling mud to impart the proper density. Viscosity and gel strength are imparted by the clay or bentonite component. A typical drilling mud will have a density of from 9 to 18 pounds per gallon and in general, for satisfactory drilling, will have a viscosity below about 60 centipoises at 75° F. as measured on the Stormer viscosimeter at 600 R. P. M.

The gel forming and viscosity characteristics of a drilling fluid are by far the most important.

In order to perform the function of carrying cuttings from the drill bit to the earth's surface where the cuttings drop out in the mud pit the drilling fluid must have a selected viscosity such that the fluid may be pumped through the system and also such that the cuttings will remain suspended in the fluid during the flow of the fluid up the borehole. Also, the fluid, when it is relatively quiescent, should permit the cuttings to fall a few feet since it is essential that the cuttings settle out at the surface. On the other hand, the fluid should have the property of gelling on standing, in order to avoid permitting undue settling of the cuttings in the well itself when drilling and circulation of fluid are temporarily halted. Accordingly, a drilling fluid should be thixotropic, i. e., it should be fluid when subjected to agitation but when standing should set to a gel of sufficient strength to retain cuttings in the time required for the cuttings to settle a few feet.

The properties of a drilling fluid are changed during drilling because the hole traverses strata which are composed of shales, clays, etc., which become dispersed in the fluid. When the strata traversed contains certain clays or such materials as alkaline earth metal compounds, particularly calcium compounds, or when cement is being drilled out, the drilling fluid is liable to become too viscous. In drilling a well in many fields it is necessary to keep a close watch on the drilling fluid and to treat it with chemicals at the surface so as to counteract the effect of contaminants.

When the drilling mud has become too viscous it is necessary to add a viscosity reducing agent. However, most of the materials commonly employed suffer from the disadvantage of being subject to hydrolysis, which reduces their effectiveness for this purpose. This is particularly true of the alkali metal polyphosphates such as sodium tetraphosphate. Since the products of hydrolysis are relatively ineffective as viscosity reducers, this makes it necessary to repeat the treatment at regular intervals, the frequency of the treatment being governed by the rate of hydrolysis of the treating agent. This continued treatment results in a gradual increase in the concentration of the hydrolysis products. Since the hydrolysis products of many commonly used treating agents are inorganic salts, high concentrations of which are effective flocculating agents for clays, a point is soon reached where further treatment is of no value because the effect of the additional treating agent is not sufficient to overcome the flocculating action of the salts already present in the mud. A mud which has been treated to this extent so that it is not susceptible to further treatment is said to be overtreated and presents a serious problem because of the difficulty involved in controlling its properties.

In order to restore the desired viscosity to a drilling mud which has too low a viscosity as a result of overtreatment, it is advantageous to add a thickening agent. Thickening agents are also of value when rotary drilling operations are being carried out in inaccessible locations where the price of bentonite becomes excessive because of shipping charges. In the latter case the use of a thickening agent permits the production of a suitable mud with far less bentonite than would otherwise be possible. Suspensions of bentonite are known to be thickened and gelled by inorganic salts such as NaCl, CaCl$_2$, MgCl$_2$, CaSO$_4$ and the like. However, these materials are of little practical value as thickening agents for bentonite suspensions since it is difficult to control the viscosity within reasonable limits. It is also difficult to avoid overtreatment of the mud when treating with these materials.

The need for more reliable thickening agents is thus apparent and it is one object of the present invention to provide efficient viscosity increasing agents for drilling fluids which will not possess the disadvantages inherent in the inorganic thickening agents.

In accordance with the present invention drilling mud viscosity increases agents or thickening agents are employed comprising the reaction products of alkylene oxides with fatty acid esters or, preferably, partial esters of anhydro derivatives of the hexitols. When a hexitol such as sorbitol, mannitol or dulcitol is treated with a suitable dehydrating agent the hexitol loses one molecule of water to form an inner ether derivative known as a hexitan, e. g. sorbitan, derived from sorbitol. The hexitans may then be esterified with a suitable fatty acid to form a hexitan ester, e. g. sorbitan mono-oleate. Suitable methods of preparing hexitan esters are described in U. S. Patent 2,322,820 of Kenneth R. Brown.

To prepare the drilling mud thickening agents of the present invention the hexitan esters are treated with 10 to 30 molecular proportions of an alkylene oxide such as ethylene oxide, in the presence of a catalyst such as sodium methylate. A method of preparing alkylene oxide derivates of hexitan fatty acid esters suitable for use in the present invention is described in U. S. Patent 2,380,166 of William C. Griffin. The hexitan fatty acid ester polyoxyalkylene derivatives prepared by treating sorbitan and mannitan partial fatty acid esters with alkylene oxides are marked commercially under the trade name "Tweens."

Among the polyoxyalkylene derivatives contemplated for use in this invention are those prepared from the mono or diesters of sorbitan, mannitan or other hexitans, and such fatty acids as palmitic, stearic, oleic or myristic, lauric, and the like. Particularly preferred are the water-soluble products of reaction of alkylene oxides with sorbitan mono-oleate, monostearate, monolaurate and monopalmitate.

The effectiveness of hexitan fatty acid ester polyoxyalkylene derivatives as drilling mud thickening agents may be seen from the following example:

An aqueous slurry of 4 percent bentonite in water was prepared and was found to have a viscosity of 7.2 centipoises at 75° F. as measured by the Stormer viscosimeter at 600 R. P. M. Addition of 0.25% of the polyoxyalkylene derivative of sorbitan monopalmitate, known commercially as Tween 40, increased the viscosity of this slurry 130 percent. The thickening effect was particularly surprising since the Tweens are recommended as viscosity reducers for colloidal suspensions.

The advantages of employing the polyoxyalkylene compounds of the class described above include the following: (1) They are non-ionic and inorganic salts do not interfere with their action; (2) If hydrolysis occurs, the products of hydrolysis are non-ionic so that continued treatment with these compounds will not produce an overtreated mud; and (3) A more satisfactory viscosity control can be obtained than by the use of inorganic salts.

In practicing the present invention it is contemplated that the polyoxyalkylene compounds be added to the drilling mud in concentration of about 0.1% to about 10% and preferably in concentrations of about 0.1% to about 5%.

It is not intended that the invention be limited by the specific examples given but only by the following claims.

What is claimed is:

1. A drilling fluid comprising an aqueous dispersion of a clay to which has been added a viscosity increasing amount of a polyoxyalkylene derivative of a hexitan ester of a higher fatty acid.

2. Drilling fluid according to claim 1 in which the polyoxyalkylene derivative is employed in concentrations of the range of 0.1 to 5%.

3. A drilling fluid comprising an aqueous suspension of bentonite and from 0.1 to 5% of the reaction product of sorbitan monopalmitate and an alkylene oxide.

4. A drilling fluid comprising an aqueous suspension of bentonite and from 0.1 to 5% of the reaction product of sorbitan monolaurate and an alkylene oxide.

5. A drilling fluid comprising an aqueous suspension of bentonite and from 0.1 to 5% of the reaction product of sorbitan monostearate and an alkylene oxide.

6. A drilling fluid comprising an aqueous suspension of bentonite and from 0.1 to 5% of the reaction product of sorbitan mono-oleate and an alkylene oxide.

7. A drilling fluid comprising an aqueous suspension of bentonite and a viscosity increasing amount of a water soluble reaction product of 1 mol of a hexitan partial higher fatty acid ester and from 10 to 30 mols of ethylene oxide.

VICTOR G. MEADORS.

REFERENCES CITED

The following references are of record in the file of this patent:

UNITED STATES PATENTS

| Number | Name | Date |
| --- | --- | --- |
| 2,423,144 | Gregg | July 1, 1947 |
| 2,425,768 | Wagner | Aug. 19, 1947 |